(No Model.)
T. J. KIRKPATRICK.
SEAT FOR BICYCLES.
No. 465,669. Patented Dec. 22, 1891.
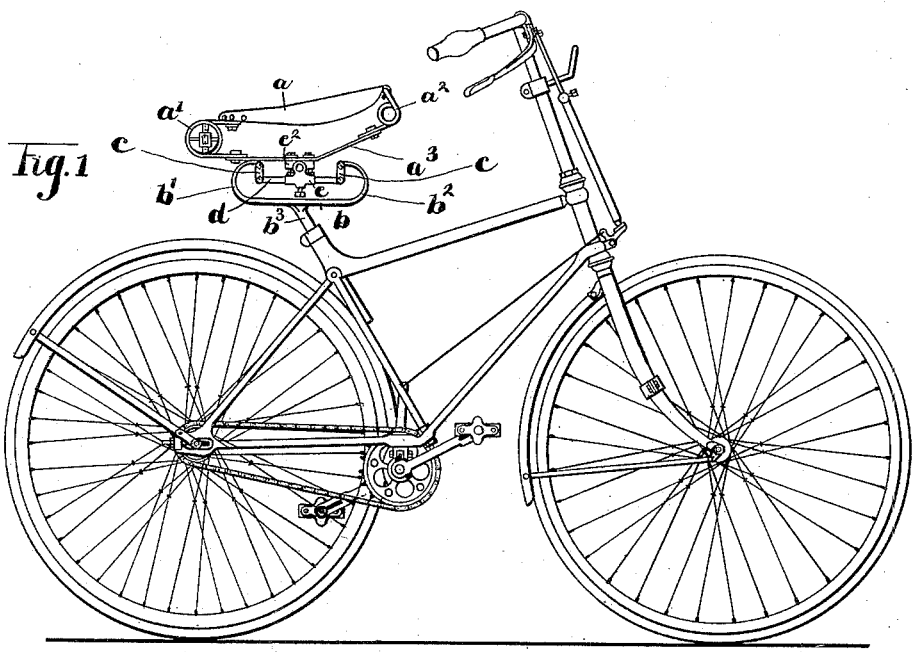
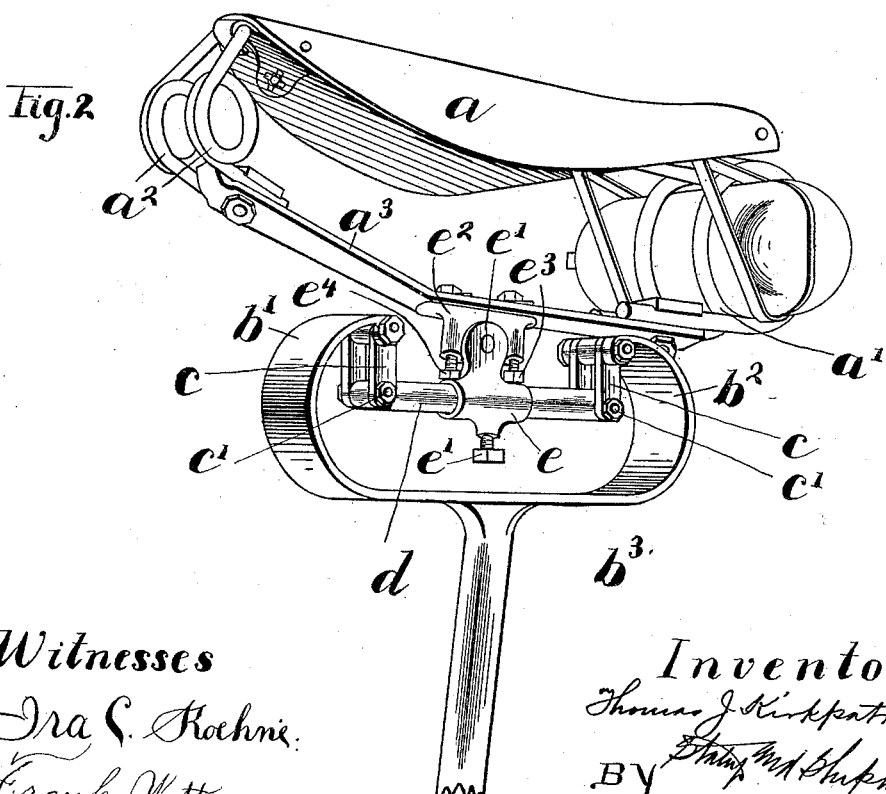
Witnesses
Ira C. Koehne.
Frank Watt
Inventor
Thomas J. Kirkpatrick
BY
Attorneys

UNITED STATES PATENT OFFICE.

THOMAS J. KIRKPATRICK, OF SPRINGFIELD, OHIO.

SEAT FOR BICYCLES.

SPECIFICATION forming part of Letters Patent No. 465,669, dated December 22, 1891.

Application filed August 28, 1891. Serial No. 403,975. (No model.)

*To all whom it may concern:*

Be it known that I, THOMAS J. KIRKPATRICK, a citizen of the United States, residing at Springfield, in the county of Clark and State of Ohio, have invented certain new and useful Improvements in Seats for Bicycles, of which the following is a specification.

My invention relates to improvements in seats for bicycles; and the object of my invention is to provide an improved seat and support therefor especially adapted for use with that type of bicycle known as a "Safety," in which the rider sits between the wheels or more over the rear wheel, which rear wheel is also the driving-wheel.

The object of my invention is to provide a bicycle-seat and support therefor adapted to be readily applied to a device of this character and to compensate for the fore and aft jars occasioned by passing over obstructions or inequalities in the road surface.

My invention consists in the various constructions and combinations of parts hereinafter described, and set forth in the claims.

In the accompanying drawings, Figure 1 is a side elevation of a bicycle to which my improved seat and support have been applied. Fig. 2 is a perspective view of the seat and its supporting device in detail.

Like parts are represented by similar letters of reference in the several views.

In said drawings, $a$ represents the seat or saddle proper, which is of the hammock type and supported at each end by independent front and rear springs $a'$ $a^2$, each of which is connected to the respective ends of a spring-supporting bar $a^3$. Immediately below the spring-supporting bar $a^3$ is the seat-support proper $b$, which consists of a T-shaped frame-piece having at the top upturned inwardly-projecting extremities $b'$ $b^2$ and a central downwardly-projecting stem or spindle $b^3$, preferably arranged at an acute angle to the plane of the upwardly-projecting ends $b'$ $b^2$. Depending from the projecting ends $b'$ $b^2$ are pivoted links $c$, connected at their lower ends to a round bar or shaft $d$, perforated at each end to receive the connecting-bolts $c'$, which pass through the lower ends of said links and said bar. Located on the shaft or bar $d$ is a sleeve $e$, provided with a set-screw $e'$, by means of which it may be secured at different points of adjustment along the said bar or shaft. This sleeve $e$ is provided with upwardly-extending wings $e'$, which embrace a connecting-block $e^2$, to which the seat-bar $a^3$ is secured, said block $e^2$ being provided with adjusting-screws $e^3$ $e^4$, adapted to normally rest in contact with the sleeve $e$ and furnish means for changing the angle of the seat-bar with reference to said sleeve.

All the parts of the seat-support $b$ are preferably formed rigid or unyielding, the independent front and rear springs to the hammock-saddle $a$ being adapted to furnish the necessary vertically-yielding movement.

In operation the spindle $b^3$ is secured directly to the frame of the bicycle by passing into a sleeve or socket provided for that purpose. The said support, being rigid or unyielding, undergoes the same vibrations as the frame of the machine. The fore and aft jars, however, transmitted to the frame are compensated for by the back-and-forth movement of the bar or swinging shaft $d$, which movement is entirely independent of the elastic front or rear springs of the seat or saddle proper.

The use of this unyielding but laterally-swinging seat-support, in connection with the hammock-saddle with the front and rear supporting-springs, is found in practice to compensate for the various front and vertical jars in machines of this character.

Having thus described my invention, I claim—

1. A bicycle-seat having a T-shaped rigid support with upturned inwardly-projecting extremities and a downwardly-projecting stem, and a straight unyielding bar connected to said extremities and depending therefrom by pivoted links, substantially as specified.

2. The combination, with a hammock-saddle having the front and rear supporting-springs and a connecting-bar, of a seat-support having the upturned inwardly-projecting extremities and the downwardly-projecting stem and a rigid bar suspended by pivoted links from said extremities and a pivot connection between said suspended bar and seat-bar, substantially as specified.

In testimony whereof I have hereunto set my hand this 25th day of August, A. D. 1891.

THOMAS J. KIRKPATRICK.

Witnesses:
 R. D. BALDWIN,
 PAUL A. STALEY.